United States Patent [19]
Kaemmer

[11] 3,741,247
[45] June 26, 1973

[54] FLUIDIC PRESSURE AMPLIFIER

[75] Inventor: Herbert H. Kaemmer, Whippany, N.J.

[73] Assignee: Automatic Switch Company, Florham Park, N.J.

[22] Filed: Dec. 10, 1971

[21] Appl. No.: 206,844

[52] U.S. Cl............................ 137/625.66, 251/61.2
[51] Int. Cl............................................. F16k 11/02
[58] Field of Search................. 137/625.66, 625.26; 251/61.2, 61

[56] References Cited
UNITED STATES PATENTS

| | | | |
|---|---|---|---|
| 3,389,720 | 6/1968 | Brandenberg.................. | 137/625.66 |
| 3,521,850 | 7/1970 | German...................... | 137/625.66 X |
| 2,837,148 | 6/1958 | Jay............................... | 137/625.26 |

Primary Examiner—Henry T. Klinksiek
Attorney—Alan H. Levine

[57] ABSTRACT

A fluidic pressure amplifier comprising a body having a logic port for receiving a fluidic signal from a fluidic logic control circuit, an inlet port for connection to a source of fluid pressure higher than the pressure of the logic signal, an outlet port for connection to an interface device which controls fluid at a still higher working pressure, and an exhaust port. The body also includes a bore with which the inlet, outlet, and exhaust ports communicate, a valve seat between the inlet port and one end of the bore, and an opening in the bore wall communicating with the exhaust port. A unitary valve element includes a spool snugly but slidably arranged within the bore, a valve disk axially spaced from the spool, and a reduced diameter rod interconnecting the spool and disk. A diaphragm is connected to the end of the spool opposite the disk and is exposed to pressure at the logic port. This latter pressure urges the spool into a position wherein it covers the opening in the bore wall and separates the disk from the valve seat, whereby the inlet and outlet at the inlet port urges the spool into a position wherein it uncovers the opening and the disk engages the valve seat, whereby the outlet and exhaust ports communicate, but not the inlet and outlet ports.

9 Claims, 3 Drawing Figures

PATENTED JUN 26 1973　　　　　　　　　　　　　　　　3,741,247

FLUIDIC PRESSURE AMPLIFIER

This invention relates to fluidic logic control circuits, and more particularly to an amplifier for amplifying the fluidic logic output signals from such a circuit to produce fluidic signals at a higher pressure.

The supply pressure to a fludic logic control circuit is usually a relatively substantial pressure of 1 to 10 pounds per square inch gage (psig), the particular pressure used depending upon a number of different circuit variables. The fluidic output signal of such a circuit usually has a pressure in the range of only 2 to 30 inches of water column, i.e., about 0.075 to 1.0 psig, accompanied by a flow rate of only a fraction of a cubic foot per hour. Furthermore, most fluidically controlled systems employ an interface device between the fluidic output signal of the control circuit and the working medium, e.g., a higher pressure fluid, being controlled.

However, the low pressure, low volume fluidic output signal generally does not have sufficient power to operate an interface device directly. Therefore, it is common to employ interface devices of the so-called constant bleed or pressure-assist type. In this type of device, the high working pressure fluid is supplied to the device and is normally continuously bled from it to prevent build up of pressure. The bleeding takes place through an orifice in the device which is made extremely small to minimize the amount of leakage. Upon receipt of a fluidic logic signal, the bleed orifice is closed allowing the working fluid to build up to working pressure and operate the device.

Interface devices of the constant bleed type suffer a number of disadvantages, including the continuous drain of air power involved in their use. Furthermore, where they are used in dusty or otherwise contaminated atmospheres, the tiny bleed orifices readily become clogged, resulting in failure of the devices, unless the working fluid is filtered, which of course adds to the expense and complexity of the system.

It is an object of the present invention to overcome these problems by making use of the constant bleed type interface device unnecessary.

It is another object of the invention to provide an amplifier responsive to low power output signals from a fluidic control circuit for providing higher power signals capable of operating an interface device which controls an even higher pressure working fluid.

It is a further object of the invention to provide such an amplifier which uses the supply fluid pressure to the fluidic logic control circuit to operate the interface device, and not the working fluid pressure.

An important advantage of the invention is that it permits the use of an interface device in which the working fluid is completely isolated from the fluid employed by the fluidic control circuit.

It is an additional object of the invention to provide a fluidic pressure amplifier of extremely simple construction, having very few parts, and in particular which employs no springs to actuate the moving parts of the amplifier.

It is still another object of the invention to provide such an amplifier which is subjected to only low pressures, and hence is capable of long service without maintainance, and yet which has an extremely fast response upon receipt of a fluidic output signal.

Additional features and advantages of the invention will be apparent from the following description in which reference is made to the accompanying drawings.

Figure 1:
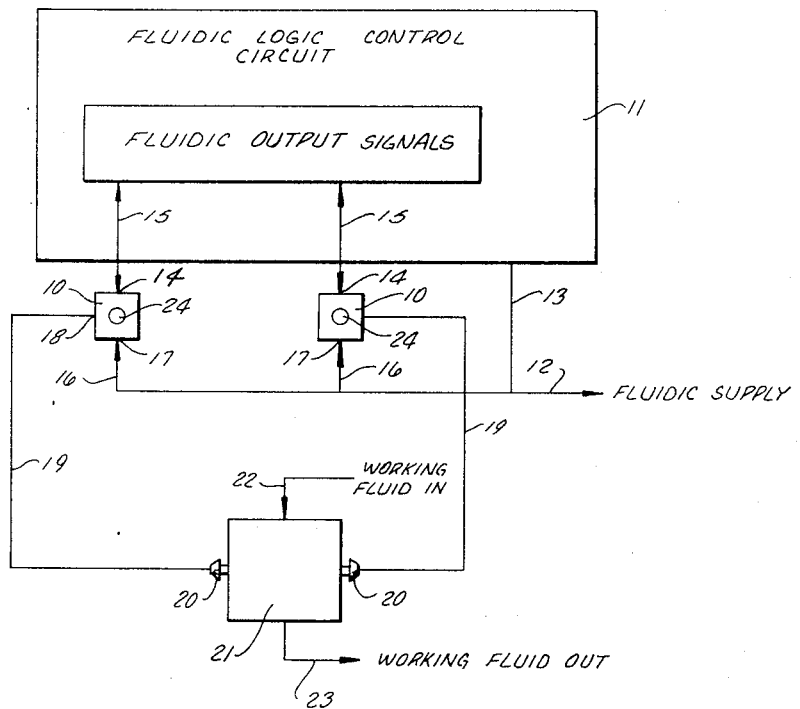
FIG. 1 is a schematic illustration of fluidic control circuit employing amplifiers according to this invention.

FIG. 1 illustrates a typical environment in which fluidic pressure amplifiers 10 according to the invention may be employed. The fluidic logic control circuit 11 is completely conventional and is supplied with fluid pressure from a suitable source (not shown) through conduits 12 and 13. This inlet fluid pressure may be, for example, 1.4 psig. The control circuit 11 may include a coanda or wall effect device, or a turbulence amplifier. In any case, the fluidic device included in the control circuit puts out logic signals in the form of low pressure, low volume jets of fluid, such as air. Each output signal, which may have a pressure of, for example, five inches of water, is transmitted to the logic port 14 of an amplifier 10 via a conduit 15. According to the invention, the supply fluid for the control circuit 11 is also furnished, via conduits 12 and 16, to the inlet port 17 of each amplifier 10. In response to receipt of a fluidic output signal at its logic port 14, each amplifier 10 provides at its output port 18 an amplified signal having the supply pressure of 1.4 psig. Thus, in the present example, each amplifier 10 effectively serves to increase the pressure of a logic signal produced by the control circuit from a pressure of five inches of water, which is as a practical matter unusable for control purposes, to a more useful pressure of 1.4 psig. Each emplifier also has an exhaust port 24 communicating with a relatively low pressure region such as the atmosphere.

The signal at the output port 18 of each amplifier 10 is transmitted via a conduit 19 to an inlet 20 of an interface device 21, which may for example be a valve of the type illustrated and described in my U.S. Pat. No. 3,454,045. Interface device 21 may control the flow of a working fluid at a much higher pressure than that of the fluidic supply, the working fluid entering device 21 through conduit 22 and leaving through conduit 23. Although for the sake of convenience, only a single interface device 21 is shown, operated by a fluidic control circuit producing two logic signals, obviously the control circuit may be one having more than two outputs for controlling a plurality of interface devices. However, in such a case, each output of the control circuit would be connected to its respective interface device via an amplifier 10.

Figure 2:
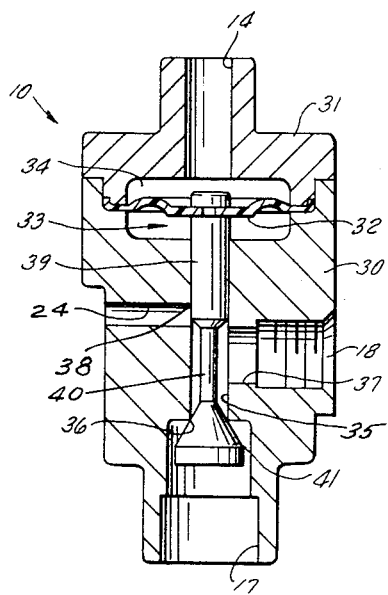
FIG. 2 is a cross-sectional view showing an amplifier according to the invention in closed condition.
Figure 3:
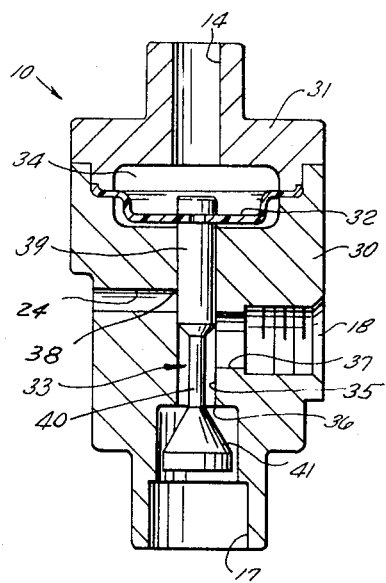
FIG. 3 is a view similar to FIG. 2 showing the amplifier in open condition.

The fluidic pressure amplifier 10 chosen to illustrate the present invention is shown in detail in FIGS. 2 and 3. The amplifier consists of just four parts, namely, a body 30, an end cap 31, a diaphragm 32, and a valve element 33. Body 30 and end cap 31 together define a diaphragm chamber 34 accommodating diaphragm 32, chamber 34 communicating with logic port 14. The peripheral edge of diaphragm 32 is squeezed tightly between the body and end cap. The latter two parts may be joined permanently or temporarily in any practical way, and if formed of a suitable plastic they may be permanently joined by ultrasonic welding.

A bore 35 joins diaphragm chamber 34 with inlet port 17, the end of the bore opening into port 17 defining a valve seat 36. The wall of bore 35 is furnished with openings 37 and 38 through which the bore communicates with outlet port 18 and exhaust port 24, respectively.

Valve element 33 includes a spool portion 39 snugly fitted, but axially slidable, within bore 35. One end of spool 39 is fixed to the center of diaphragm 32. The other end of the spool is connected by a reduced diameter rod 40 to a conical valve disk 41 cooperable with valve seat 36. Sppol 39, rod 40, and disk 41 may be formed from a single piece of metal or other suitable material.

Fluidic supply pressure is constantly applied to inlet port 17 via conduits 12 and 16. This pressure normally maintains amplifier 10 closed, as shown in FIG. 2. In this condition, valve disk 41 engages valve seat 36 and prevents communication between inlet port 17 and outlet port 18. However, spool 39 only partially covers opening 38. Hence, outlet port 18 communicates with exhaust port 24, via opening 37, the annular region of bore 35 surrounding rod 40, and opening 38. As a result, the inlet 20 of interface device 21, to which outlet port 18 is connected, is exhausted.

When a fluidic logic signal is applied to logic port 14, via conduit 15, diaphragm 32 and hence valve element 33 are moved downwardly, as shown in FIG. 3, to open the amplifier. As a result, spool 39 completely covers opening 38 and valve disk 41 moves out of engagement with seat 36. Consequently, outlet port 18 communicates with inlet port 17 but not with exhuast port 24. Thus, the supply fluid at inlet port 17 flows through outlet port 18 to the inlet 20 of interface device 21. When the logic signal at port 14 terminates, the supply fluid pressure in bore 35 acts upon the lower face of spool 39 and drives it upwardly, thereby returning the parts to the closed condition shown in FIG. 2. It is to be noted that the movement of valve element 33 takes place without the need for a return spring.

The volume of diaphragm chamber 34 above diaphragm 32 can be made extremely small, e.g., less than 0.3 cubic centimeters, whereby the response time of the amplifier to a logic signal applied to port 14 is very fast, e.g., on the order of 13 milliseconds. Furthermore, all the flow passages are of substantial size so that no special filtering of the fluid is required to prevent clogging of these passages.

The invention has been shown and described in preferred form only, and by way of example, and many variations may be made in the invention which will still be comprised within its spirit. It is understood, therefore, that the invention is not limited to any specific form or embodiment except insofar as such limitations are included in the appended claims.

What is claimed is:

1. A fluidic pressure amplifier having no springs for use between a fluidic logic control circuit which yields a low pressure output signal and an interface device which controls the flow of fluid at a higher working pressure, consisting of:
    a. a body having a stationary valve seat,
    b. an inlet port in said body adapted to be connected to a source of fluid at an intermediate pressure between the fluidic output signal pressure and the working pressure,
    c. an outlet port in said body adapted to be connected to the interface device,
    d. a logic port in said body adapted to receive the fluidic output signal,
    e. an exhaust port in said body,
    f. a unitary element movable within said body, said element being responsive in the absence of said low pressure output signal, to the intermediate pressure at said inlet port for engaging the stationary seat to prevent communication between said inlet and outlet ports while permitting communication between said outlet and exhaust ports, and
    g. means responsive to the fluidic output signal pressure at said logic port for moving said element out of engagement with the stationary seat to prevent communication between said outlet port and said exhaust port while permitting communication between said inlet port and outlet port,
    whereby the position of said element is controlled by the intermediate pressure and the fluidic output signal to provide an intermediate pressure output signal at the output port when the low pressure signal is applied to the logic port.

2. A fluidic pressure amplifier as defined in claim 1 wherein said responsive means (g) includes a diaphragm exposed to pressure at said logic port and operatively connected to said element.

3. A fluidic pressure amplifier as defined in claim 1 wherein said body includes a bore communicating with said inlet port, and said element includes a spool section snugly but slidably arranged within said bore, said spool section being movable axially within said bore by the intermediate pressure at said inlet port.

4. A fluidic pressure amplifier as defined in claim 3 wherein said outlet port communicates with said bore, wherein the valve seat is located between said bore and inlet port, and wherein the element includes a valve disk section cooperable with said valve seat, intermediate pressure at said inlet port urging movement of said spool section in a direction which causes said disk to engage said seat and thereby prevent communication between said inlet and outlet ports.

5. A fluidic pressure amplifier as defined in claim 4 wherein the element includes a reduced diameter rod extending axially within said bore and interconnecting said spool section and said disk section, the annular region of said bore surrounding said rod constituting a flow passage through which said outlet and exhaust ports communicate when said disk engages said seat.

6. A fluidic pressure amplifier as defined in claim 5 wherein said body includes a diaphragm chamber communicating with the end of said bore opposite to the end with which said valve seat communicates, said chamber also communicating with said logic port, and said responsive means (g) includes a diaphragm within said chamber connected to the end of said spool section opposite the end to which said valve disk section is connected, said diaphragm responding to pressure at said logic port for urging said spool in a direction tending to separate said disk section and valve seat.

7. A fluidic pressure amplifier as defined in claim 6 including an opening in the wall of said bore through which said exhaust port can communicate with said annular region of said bore, said spool section closing said opening when said disk section and valve seat separate and said spool section uncovering at least a portion of said opening when said disk engages said valve seat.

8. A fluidic pressure amplifier as defined in claim 3 wherein said responsive means (g) includes a diaphragm exposed to pressure at said logic port and operatively connected to said spool section, said diaphragm being responsive to pressure at said logic port for urging said spool section in a direction opposite to the direction in which pressure at said inlet port urges said spool section.

9. A fluidic pressure amplifier as defined in claim 8 wherein the valve seat is located between said bore and inlet port, wherein the member includes a valve disk section connected to said spool section and cooperable with said valve seat, and including an opening in the wall of said bore communicating with said exhaust port, intermediate pressure at said inlet port urging movement of said spool section in a direction which causes said disk section to engage said seat and said spool section to at least partially uncover said opening, and a fluidic output signal at said logic port urging movement of said diaphragm and hence said spool section in a direction which causes said disk section and valve seat to separate and said spool section to cover said opening.

* * * * *